C. C. CARTER.
COMBINED COTTON CHOPPER AND CULTIVATOR.
APPLICATION FILED DEC. 27, 1909.

972,332.

Patented Oct. 11, 1910.
2 SHEETS—SHEET 1.

Witnesses
Chas. L. Griesbauer.
E. M. Ricketts.

Inventor
C. C. Carter
By Watson E. Coleman
Attorney

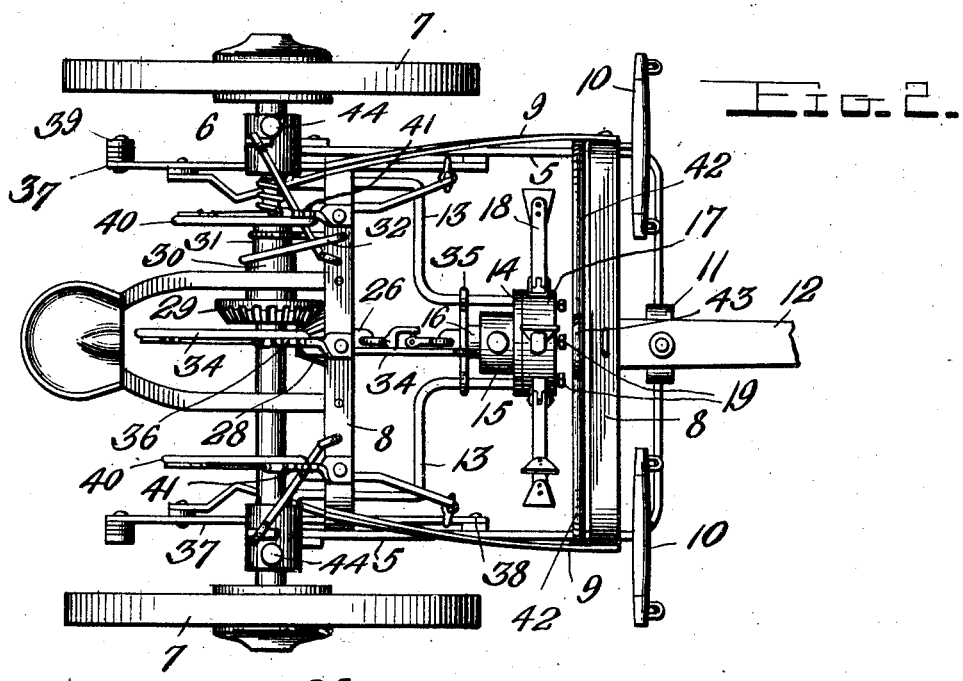

UNITED STATES PATENT OFFICE.

CHESTER CLARK CARTER, OF WAWAKA, TEXAS.

COMBINED COTTON CHOPPER AND CULTIVATOR.

972,332.  Specification of Letters Patent.   Patented Oct. 11, 1910.

Application filed December 27, 1909. Serial No. 534,914.

*To all whom it may concern:*

Be it known that I, CHESTER C. CARTER, a citizen of the United States, residing at Wawaka, in the county of Ochiltree and State of Texas, have invented certain new and useful Improvements in Combined Cotton Choppers and Cultivators, of which the following is a specification, reference being had to the accompanying drawings.

This invention relates to certain new and useful improvements in cotton choppers and has for its primary object to provide a combined cotton chopper and cultivator whereby the cotton may be chopped from the rows to leave the same in hills, thus facilitating its growth.

Another object is to provide a machine of comparatively simple construction whereby the cutter arms may be adjusted above the plants to remove the proper portion thereof, said arms being carried by a rotatable disk operated by connections to the wheel shaft.

A further object is to provide means for yieldingly holding the cutting arms in radial position whereby the breaking of the arms upon encountering an obstruction is prevented.

Figure 1:
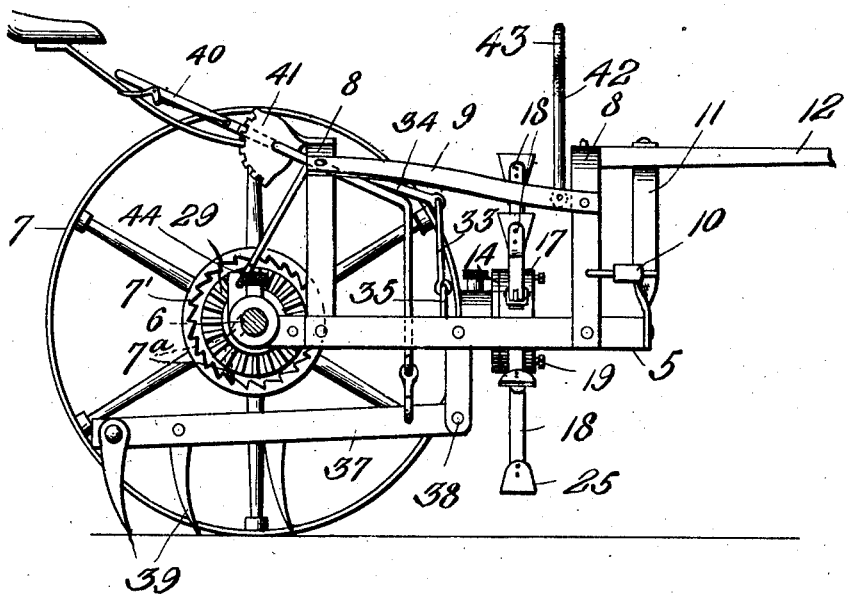
Figure 3:
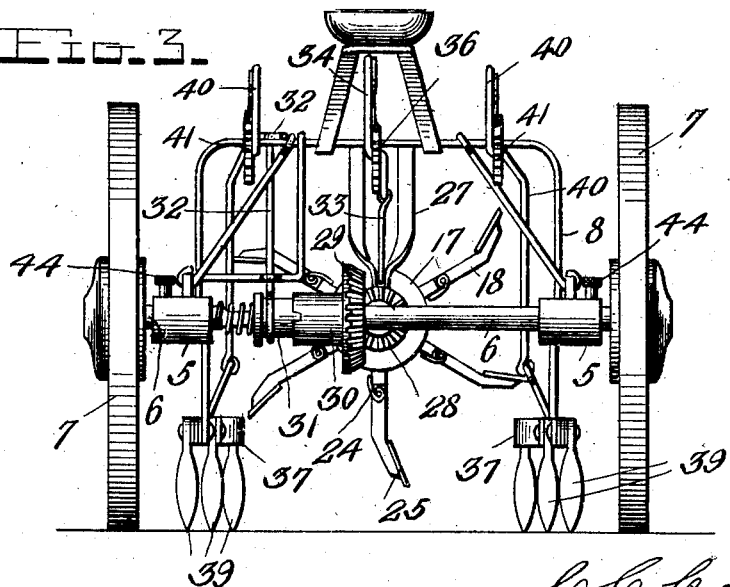

With these and other objects in view, the invention consists of the novel construction, combination and arrangement of parts, hereinafter fully described and claimed, and illustrated in the accompanying drawings in which, Figure 1 is a side elevation illustrating one embodiment of my invention, one of the traction wheels being removed; Fig. 2 is a top plan view; Fig. 3 is a rear end elevation; Fig. 4 is a detail perspective view of the rotatable chopping head and arms, and Fig. 5 is a detail vertical section through one of said arms.

Referring to the drawings, 5 indicates a frame preferably constructed of bar metal and mounted at its rear end upon the wheel shaft 6, upon the extremities of which the traction wheels 7 are loosely mounted. Each of the wheels 7 carries a ratchet 7' the teeth of which are engaged by a spring pawl 7ª secured to the shaft 6. In this manner the wheels are normally locked upon the shaft. Upon the reverse movement of the wheels the pawl will move over the ratchet teeth and the shaft remain stationary. The ratchets would preferably be covered by a suitable casing. Adjacent to the opposite ends of this frame the transverse U-shaped bars 8 are secured and are braced by means of the inclined bars 9. To the forward bar 8 the swingle trees 10 are attached. This bar is also connected to the main frame by the metal strap 11 which is secured between its ends to the tongue 12.

Rods 13 are bent into substantially L-shaped form, as clearly shown in Fig. 2, and have their ends pivoted in the bearings of the frame upon the wheel shaft. The inner longitudinally extending portions of these rods are spaced from each other and have secured to their extremities a circular bearing plate 14, with which a sleeve 15 is integrally formed. A short shaft 16 extends through this sleeve and upon its outer end a head 17 is secured. This head carries the radially extending arms 18 which are removably secured therein by means of the set screw 19. The detail construction of these arms is more clearly shown in Fig. 5 and as shown therein they are each formed in two sections, the lower or outer section 20 of which is formed with an ear or lug 21, which is disposed in the bifurcated lower end of the other of the arm sections secured in the circular head by the screw 19. This lug is provided with an aperture which receives a pin 23, said pin extending transversely through the bifurcated end of the arm section and projecting beyond the opposite sides thereof. A spring 24 formed of resilient wire and bent into approximately U-shaped form has its ends coiled around the ends of the pin 23, the intermediate or bight portion of said spring bearing upon the outer pivoted arm section. Upon the extremities of each of the arms a metal plate or cutter 25 is secured and is adapted to chop the superfluous cotton from the drilled rows, whereby the hills may be formed. The shaft 16 is connected at its inner end by means of a universal joint with the pinion shaft 26. This shaft is rotatably supported in the lower ends of the hanger bars 27 and has secured thereon a pinion 28 which meshes with a gear 29 formed upon one end with a sleeve 30, loosely disposed upon the wheel shaft. A clutch member 31 is keyed upon the shaft and is longitudinally slidable thereon by means of a shifting rod 32 which extends through the transverse U-shaped frame bar 8. The lower end of this shifting rod is loosely positioned in a circumferential groove in the clutch member 31. This clutch member is normally held in engagement with the sleeve 30, whereby the gear 29 will be locked upon the wheel shaft. Thus it will be obvious that as the machine progresses over the ground, the chopping arms 19 will be rotated through the medium of the intermediate meshing gears 28 and 29, and the cutting blades 25 will be successively brought into engagement with the cotton. The universal joint connection between the shafts 16 and 26 will permit of the raising and lowering of the arm-carrying head which is supported by the outer ends of the pivoted rods 13. This adjustment of the cutters is obtained by a link connection 33 between the inner end of a lever 34 and a connecting rod 35 secured to each of the pivoted bars 13. The operating lever 34 carries a spring pressed dog which is adapted to engage with the teeth of a rack 36 to secure the cutter head its adjusted position.

Upon the opposite sides of the frame 5 a cultivator bar 37 is pivoted, as shown at 38 and extends longitudinally beneath the wheel shaft. This bar carries a plurality of shovels 39 which are adapted to engage in the ground and work the same as the cutter arms operate upon the cotton. These cultivators may also be vertically adjusted by means of an operating lever 40 pivotally connected thereto and carrying a holding dog which engages with the teeth of the rack 41.

A rein holder 42 is secured to the forward ends of the bars 9 and is centrally formed with a ring or eye 43 through which the reins extend and are supported out of contact with the cutters 25. Oil cups 44 may also be provided in the frame bearings and the sleeve 45 as shown in Fig. 1.

In the operation of the machine, the cutter arms are first adjusted to the proper height and the machine driven over the cotton, the traction wheels moving between the rows thereof. As the cutter head is rotated, the chopping blades on the ends of the arms will be successively brought into engagement with the cotton stalks and remove the same from the rows, leaving the remaining cotton standing in hills which greatly facilitates its growth. At the same time the cultivator shovels will loosen the earth about the plants and thus insure their proper nourishment.

The machine is simply constructed and is comparatively simple. It is also very positive in its operation while the adjustment of the parts adapts it for use at various periods of the growth of the plants. The construction of the cutter arms prevents them from being accidentally broken off, thus reducing to a minimum the cost of repairs. The machine is otherwise very durable and highly efficient in its operation.

While I have shown and described what I believe to be the preferred embodiment of my invention it will be understood that the machine is susceptible of many minor modifications within the scope of the claims without departing from the spirit or sacrificing any of the advantages of the invention.

Having thus described the invention what is claimed is:

1. In a machine of the character described, the combination with a wheeled frame, of a rotatable cutter head carried by said frame, operating connections between said head and the wheel shaft for rotating the head, a plurality of arms radially extending from said head, each of said arms being formed in two sections pivotally connected, one of said sections extending into the head, a set screw threaded through the head and adapted to have binding engagement upon the arm section to rigidly secure the same therein, a cutting blade secured on the outer end of the other of the arm sections, and a spring carried by said last named section and bearing upon the other section beyond the pivot, said spring being adapted to yieldingly hold said sections normally in alinement, substantially as and for the purpose set forth.

2. In a machine of the character described, the combination with a wheeled frame, of a rotatable cutter head carried by said frame, operating connections between said head and the wheel shaft for rotating the head, a plurality of arms radially extending from said head, each of said arms being formed in two sections relatively movable, one of said sections being rigidly secured in the cutter head, a cutter blade secured to the extremity of the outer section, and a U shaped spring member having its extremities secured to the outer arm section and its intermediate portion engaged upon the rigidly held arm section whereby said sections are yieldingly held normally in alinement.

3. In a machine of the character described, the combination with a wheeled frame, of a rotatable cutter head carried by said frame, operating connections between said cutter head and the wheel shaft for rotating the head, a plurality of arms radially extending from said head, each of said arms being formed in two sections, one of the sections being disposed in a socket in the head, a set screw rigidly securing said section therein, the outer end of said head being formed with a tongue, the other of said sections having its inner end slotted to receive said tongue, a pivot pin extending transversely through said tongue and securing said arm sections together for relative movement, the ends of said pin being headed, and a U shaped spring member having its ends secured to the ends of said pivot pin and its bight portion engaged with the inner rigidly held arm section whereby said sections are yieldingly held in alinement.

In testimony whereof I hereunto affix my signature in the presence of two witnesses.

CHESTER CLARK CARTER.

Witnesses:
 H. V. NESBITT,
 H. W. MAY.